United States Patent [19]

Thoresen

[11] Patent Number: 4,951,438
[45] Date of Patent: Aug. 28, 1990

[54] BUILDING CONSTRUCTION

[75] Inventor: Bjørn O. Thoresen, Hønefoss, Norway

[73] Assignee: Ostspenn Holding a/s, Hønefoss, Norway

[21] Appl. No.: 287,198

[22] PCT Filed: Apr. 6, 1988

[86] PCT No.: PCT/NO88/00023
§ 371 Date: Feb. 15, 1989
§ 102(e) Date: Feb. 15, 1989

[87] PCT Pub. No.: WO88/08059
PCT Pub. Date: Oct. 20, 1988

[30] Foreign Application Priority Data

Apr. 7, 1987 [NO] Norway ............................ 871451
Feb. 17, 1988 [NO] Norway ............................ 880703

[51] Int. Cl.⁵ .............................................. E04B 1/20
[52] U.S. Cl. ............................ 52/252; 52/283;
52/704; 52/721; 403/230; 403/187
[58] Field of Search ............... 403/230, 187, 188, 254,
403/255; 52/283, 289, 703, 723, 251, 252, 250,
582, 583, 584, 587, 585, 721, 263, 432, 704

[56] References Cited

U.S. PATENT DOCUMENTS

| 1,037,416 | 9/1912 | Beverstock | 52/289 |
|---|---|---|---|
| 1,205,465 | 11/1916 | Maguire et al. | 52/723 |
| 1,461,452 | 7/1923 | Pritchard | 52/587 |
| 3,513,610 | 5/1970 | Devonport | 52/283 |
| 3,733,757 | 5/1973 | Scott | 52/283 |
| 4,068,332 | 1/1978 | Ball et al. | 403/230 |

FOREIGN PATENT DOCUMENTS

| 0008713 | 6/1979 | European Pat. Off. | |
|---|---|---|---|
| 2307756 | 8/1974 | Fed. Rep. of Germany. | |
| 2851796 | 6/1980 | Fed. Rep. of Germany. | |
| 415478 | 10/1946 | Italy | 52/233 R |
| 519144 | 3/1955 | Italy | 52/251 |
| 683562 | 2/1965 | Italy | 52/583 |
| 30100 | 10/1919 | Norway | 52/585 |
| 376308 | 7/1932 | United Kingdom | 52/432 |
| 1400595 | 7/1975 | United Kingdom. | |
| 1468733 | 3/1977 | United Kingdom | 52/263 |
| 2108548 | 5/1983 | United Kingdom. | |
| 2179115 | 2/1987 | United Kingdom. | |

Primary Examiner—James L. Ridgill, Jr.
Attorney, Agent, or Firm—Wenderoth, Lind & Ponack

[57] ABSTRACT

An arrangement joins concrete beams and columns for building structures. Adjacent parts of columns and beams to be joined are provided with imbedded joint fittings which can be engaged with each other for joining the beams and the acolumns when erecting the building structure. Each joint unit comprises the following parts: (a) a support casing or box which is imbedded in the end of the beam the box being open and flush with the transverse end surface of the beam, (b) a complementary support casing or box imbedded in the column for each beam, the box being open toward the side surface of the column and running flush therewith, and (c) a separate mountable and removable bridge element positioned in a support box in the column and in a support box in a beam and forming a bridging element between the column and the beam in the joint therebetween.

18 Claims, 4 Drawing Sheets

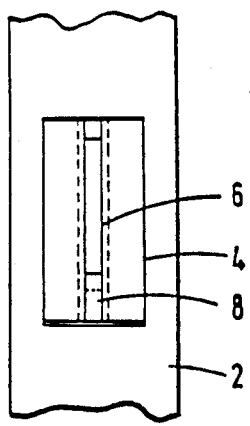
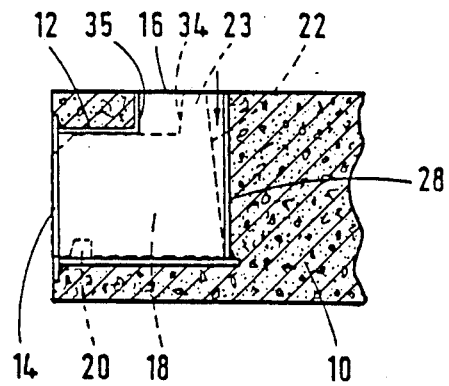
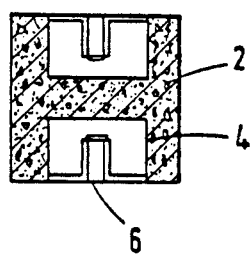
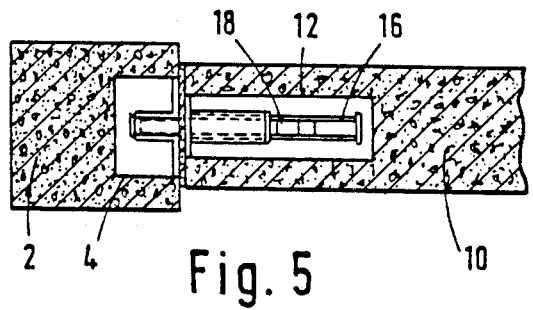
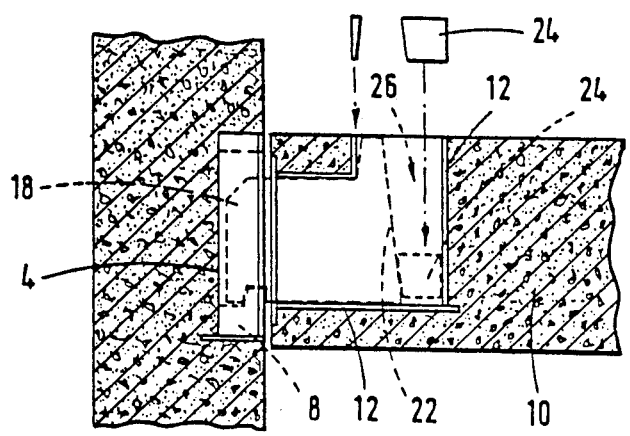

BUILDING CONSTRUCTION

BACKGROUND OF THE INVENTION

(1) Field of the Invention

The present invention relates to a novel building construction, and more particularly relates to an arrangement for joining columns and beams of concrete to provide junctions in framework structures for buildings and the like.

(2) State of the Prior Art

In building constructions consisting of concrete columns interconnected with concrete beams, the concrete columns are usually provided with lateral projections or brackets or consoles at each floor level for support of the beams. Such provision makes possible a quick erection of the building structure frames, and the beams can be given a length equal to the distance between the respective columns.

Lateral projections on the columns are, however, usually not desirable, since they complicate production, storage and transport, complicate the laying of cables and lines, and in many cases can result in corner terminations in the building which hinder interior installations. In order to avoid lateral projections the consoles can be made sufficiently low vertically, so that they are incorporated in the vertical dimensions of the beam and floor structure, but such a solution may weaken the load capacity of the structure and complicate the subsequent mounting of floor decks between the beams.

A further disadvantage with conventional console arrangements is that, in connection with the erection, there is not obtained a rigid and self supporting structure. As a remedy for these shortcomings there are used various types of joint strengthening provisions but such arrangements necessitate steps, such as bolting, welding or moulding, which lead to larger costs and delays the building work with the same result.

A further disadvantage with console columns is that the columns must be produced and delivered with pre-designed consoles in order to fit into the building in question, and in many cases one must remove consoles which are not being used. The need can arise for up to four consoles at each floor level, but in many cases there is only needed one or two consoles. This technique has led to steadily more complicated columns with consoles both in three and four directions at each floor level.

In order to avoid the use of columns with pre-fabricated consoles there has been developed several solutions for so called "console free" columns, wherein pre-fabricated concrete consoles are replaced with imbedded fittings usually, made of steel, and positioned in opposing parts of the columns and beams at each floor level in the junctions, or so called "nodes". These complementary fittings in the columns and beams, respectively, are put into engagement with each other during the mounting by means of bolts, welding or in other ways.

Illustrative of this technique is German published application No. 1,914,298. In the shown arrangement are utilized two pairs of imbedded fittings at each joint between a beam and a column. The fittings present, however, lateral console-like parts which are easily damaged during transport and otherwise possess several of the shortcomings already described. The positioning and mounting of the beams requires further welding, as well as moulding. In another known solution, boxlike fittings are imbedded in the column during the production of the column. On the building site a console is mounted into the box fitting by means of bolts, whereafter the beams may be positioned in place when the columns have been erected. The beam is thereafter fastened by means of bolts and a moulding operation.

OBJECTS OF THE INVENTION

The principal object of the present invention has been to develop a new "console free" building construction for providing joints between columns and beams which makes it possible to provide a quick, safe and time saving erection of building frame constructions with moderate demands to the technical equipment on the building site and where the joining can take place without requiring the use of bolts, welding, moulding etc.

A further object of the invention is to provide a joining method whereby the mounting immediately results in a sufficiently rigid joint between beams and columns, such that the frame structure, prior to mounting the floor decks, presents a self supporting, rigid frame.

A more specific object of the present invention is to provide solutions which, in spite of the stiffness in the junctions, allows for the possibility of certain horizontal movements between beams and columns, such that one can avoid otherwise frequently arising problems in connection with temperature variations or crimp in the concrete beams.

SUMMARY OF THE INVENTION

The invention is generally based on the idea to provide the beams as well as the columns with imbedded, outwardly open load bearing boxes which are terminated flush with the outside of the beam ends and columns, respectively, and that in each opposing pairs of boxes in the beams and columns during the erection of the building is positioned a bridge element which forms a support bridge between the beam and the columns in the junction in question. The caissons or boxes and the bridge elements are given substantially the same configuration and dimensions, such that the bridge element fills out the boxes both sideways and vertically. A further important feature of the invention is that the bridge element is provided with means in order to be locked or fixed against undesired horizontal movements relative to the beam and/or column.

A joint between a beam and a column in accordance with the invention can be realized in several different fashions.

In the preferred embodiment the bridge element is realized in the shape of one single substantially rectangular plate element or element units with much larger height than width and dimensioned such that the height constitutes a substantial part of the vertical dimension of the beam. With such a shape of the bridge element one obtains a joint with large strength and sufficient torsional resistance, especially against vertical loads, as the bridge element and thereby also the junction is simultaneously given a suitable stiffness in the horizontal plane. One can furthermore with this solution, do well with one separate joining element between beam and column, a fact which simplifies the production and the mounting.

The plate-shaped bridge element can be realized as one separate plate element or as two substantiually identical plate elements which are sandwiched against each other.

The support housings or boxes in the column can be made either for unilateral or bilateral support of beams. In the unilateral solution, separate plate-shaped bridge elements are used which are positioned in the box in the column and the beam, respectively, while in the bilateral solution the column is at the junction provided with a through-going box for reception of a two-part, or double bridge element, designed to support a beam on each side of the column. With the various embodiments for the invention the bridge elements can be fixed to the beams by means of wedge elements or the like. In the bilateral solution one can obtain the special advantage that the beams in the junction can undergo a certain horizontal movement both mutually and relative to the column. Both the bridge elements and the boxes can be made with recesses and/or locking means such that one can obtain a locking of the beams to the columns during the mounting.

The joining solution in accordance with the invention results in several important advancements in the art. Thus either the beams or the columns will present any kind of projecting support consoles, fittings or the like. As described, projecting parts on the columns imply complications both in connection with production, storage, transport and mounting. Through the invention the mounting can be carried out quickly and simply without use of welding, bolts and the like, and without the need for special tooling. By the mounting one obtains immediately a self supporting, rigid, and, especially in the vertical plane, torsionally stable construction.

As mentioned, the invention can be realized by several somewhat different embodiments, but a common feature for these embodiments is that subsequent to the mounting no exposed or metal parts will exist, either on the beams or the columns. A final fixing of the beams relative to the columns can take place by means of wedge elements, a fact which also makes possible a final adjustment of the length of the beams relative to the pre-set distance between the columns. In the embodiment wherein the bridge element consists of two sandwiched plate-shaped elements to provide a bilateral junction, the respective beams can be fixed to each plate element of the existing bridge element in mounted position such that the beams can undergo limited horizontal movements both mutually and relative to the columns and thereby compensate for dimensional variations due to temperature variation and crimp in the concrete.

BRIEF DESCRIPTION OF THE DRAWINGS

Some preferred embodiments of the invention are described in connection with the accompanying drawings, wherein:

FIGS. 1 to 6 are views illustrating one embodiment of the invention wherein a bridge element is one separate and substantially rectangular plate-shaped element.

DESCRIPTION OF THE PREFERRED EMBODIMENTS

FIGS. 1 and 2 are views which schematically show a lateral view and a plan view, respectively, through a concrete column 2 provided with an imbedded support box 4 comprising steel plating material, and which has an outwardly open, vertical slit 6 which, in the bottom thereof ends in support 8 for a beam.

Figure 6:
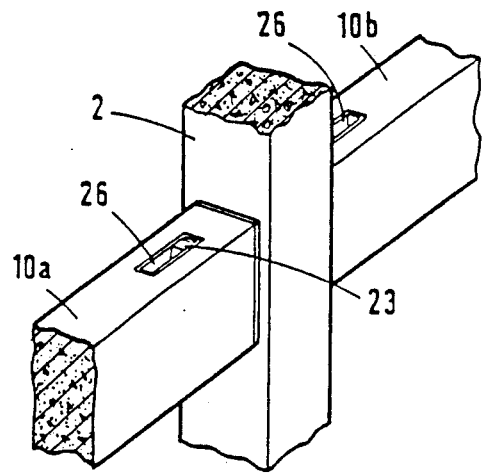
Figure 11:
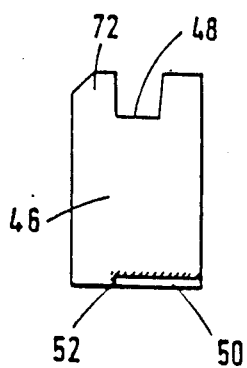
FIGS. 7 to 15 are views illustrating a second, similar embodiment of the invention wherein a bridge element and support boxes are configured such that by means of one or several wedge members a rigid joint in the vertical plane can be obtained.

In a complementary beam 10 as shown in FIGS. 4 to 6 is imbedded a complementary support box 12 of steel plate material, likewise made with a vertically open slit 14. The support box 12 is, on its top side, provided with an opening 16, at a distance from the end of the beam. In the support box 12 is positioned a limited displaceable bridge element 18, herein shown with dashed lines. The bridge element 18 is, on its under side, provided with a hook-shaped recess 20, and has on the inside edge a tilted or oblique termination 22 in order to cooperating with a complementary wedge member 24. On its top side the bridge element has an upwardly pointing part 23 for positioning in the opening 16. The bridge element 18 can be displaced outwardly and inwardly in the box 12, but cannot, due to the upwardly pointing member 23, be removed from the box 12.

During the erection of the building the column and the beam are initially positioned as shown in FIG. 4, for instance by using cranes, rigs, etc. The bridge element 18 is thereafter manually, or by means of a rod or the like placed against the part 23 through the opening 16 in the top of the beam, displaced out of the end surface of the beam and into the support box 4 in the column 2. Thereafter the beam 10 is lowered somewhat so that the recess 20 in the under edge of the bridge element 18 comes to rest on the support member 8 in the support box 4. Thereafter, the wedge-shaped locking element 24 is forced down into a wedge-shaped slit 26, which appears between the oblique rear edge 22 on the bridge element and the back wall 28 in the support box 12. Final adjustment of the joint between the beam and the column is obtained by means of wedge elements which are forced into the opening between a fore edge 34 of the upwardly pointing part 23 on the bridge element 18 and the adjacent fore edge 35 of the support box 12. One may further, if needed, position wedge elements between the front end of the beam and the column. Remaining open spaces can be filled and covered with fire inhibiting plastic foam or the like.

The perspective view shown in FIG. 6 illustrates the appearance of the junction between two beams 10a and 10b and a column 2 as described in FIGS. 1 to 5. The only visual part of the junction will be the slits 26 and, possibly, the uppermost part 23 of the bridge element 18, means shown, but these parts may be hidden by any suitable means and will, in any case, be covered below the floor deck structure.

FIGS. 7 to 15 illustrate a second embodiment of the invention.

Figure 7:
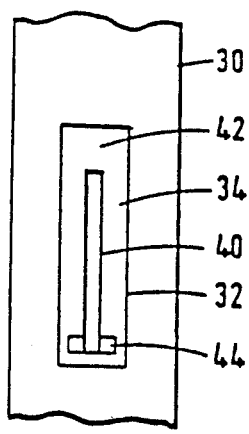
Figure 8:
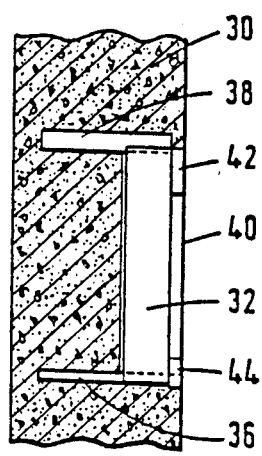

FIGS. 7 and 8 show a front view and a lateral view, respectively, (partly in section) of a concrete column 30 provided with an imbedded support box 32, preferably made of steel plate material and including a strong front face 34 and imbedded reinforcements 36 and 38. In the front face 34 is provided a vertical slit opening 40 which ends with a front locking plate 42 extended downwards from the top of the box spacing. At the bottom the box is provided with a horizontal transverse latch element 44 in the plate 34. A bridge element 46 is shown in a lateral view in FIG. 11 and is at its top provided with a recess 48, and is at its bottom, welding, provided with a transverse plate 50 which ends in a forward direction at the a point 52.

Figure 9:
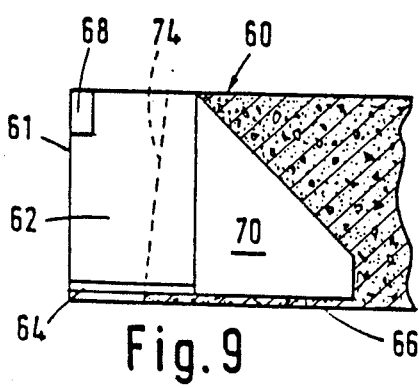
Figure 10:
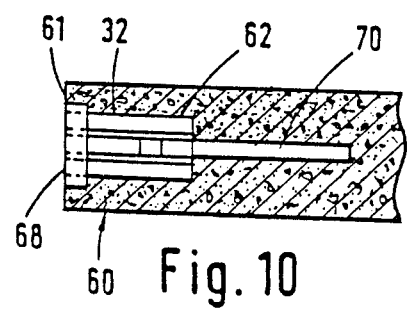

The configuration of a complementary beam 60 appears in FIGS. 9 and 10. At the front end of the beam 61 is imbedded a support box 62 which at its bottom is provided with a welded transverse plate 64 at a distance from the under side of the beam 66 and which corresponds to the thickness of the bottom plate 50 in the bridge element 46. Uppermost, at the front edge, the support box is likewise provided with a transverse support member 68. At its inner end the support box 62 is provided with an anchoring piece 70 and a forward wedge surface 74. The joining together of the beam and the columns by means of the bridge element 46 appears best from FIGS. 12, 13 and 14.

Figure 12:
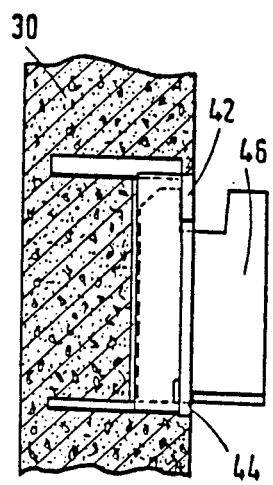

The bridge element 46 is initially kept in a somewhat tilted position against the column (not shown) such that a hook portion 72 can be placed into the box below the locking plate 42, whereafter the lower part of the bridge element can be pivoted into a correct position in the box in order to be biased against the latch element 44, such that the bridge element is positioned in the box as shown in FIG. 12. Thereafter the beam is located in a position somewhat higher than the bridge element and the support box in the beam is positioned on to the bridge element and is thereafter moved down such that the bridge element receives the weight of the beam. The support member 68 is placed down into the recess 48 in the bridge element, simultaneously as the transverse plate 64 at the bottom of the bridge element rests against the bottom plate 50 on the bridge element 46. In other words, the bridge element will be positioned in a fixed position in the box in the column both at the top and at the bottom. Finally, wedge elements 75 and 76 may be forced down between the side edge of the bridge element and the tilted fore edge of the back wall 70, and further between the rear edge of the support element 68 and the fore edge of the recess 48 in the bridge element. The beam will thereby be rigidly joined with the column such that the beam can sustain moments in the vertical plane relative to the column. Thereby is reduced beam sagging, torque loads about horizonal axes, and the vibration amplitude in the beam is reduced. The total effect of the before mentioned factors is that the beam height can be reduced.

FIGS. 16 to 27 show a third embodiment of the invention, which primarily is developed for so called "bilateral" support of beams in the junctions, i.e. one beam is positioned on each side of the column utilizing one single or a combined joint fixture. In this embodiment the bridge element is realized in the shape of two substantially identical, sandwiched or combined plate elements.

Figure 16:
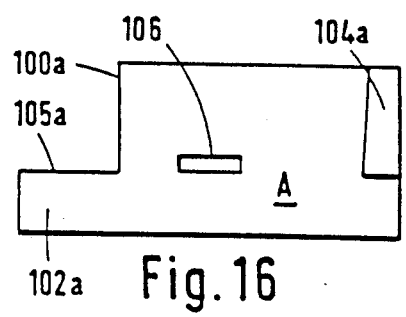
Figure 17:
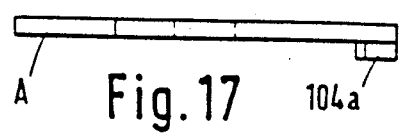

In FIGS. 16 and 17, designation A designates one of two identical plate elements A and B which together form the bridge element 98. The element has in general an elongated, rectangular shape and is provided with an upper recess 100a in the one end which provides a lower extension 102a and is at the other end provided with a lateral member in the shape of a plate element 104a, the lower edge of which has the same level as the top edge 105a of the extension 102a. In the center portion both plates A and B have an open slit 106.

Figure 19:
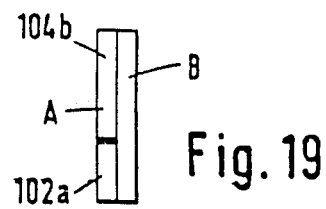
FIGS. 16 to 20 are views illustrating a bridge element of a third embodiment of the invention, where a bridge element has two substantially identical plate-shaped elements which are sandwiched together.
Figure 18:
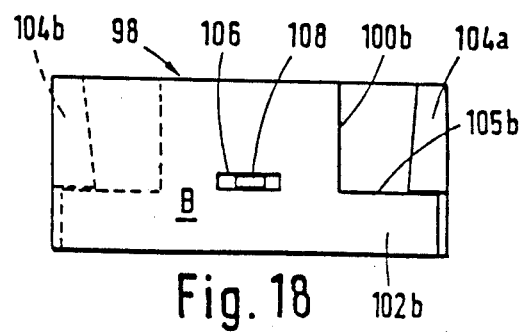
Figure 20:
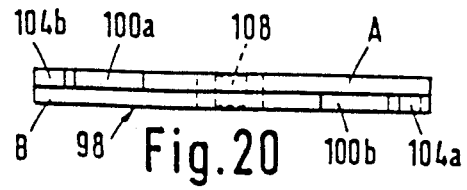

FIGS. 18, 19, and 20 show a lateral view an, end view and a plan view, respectively, of the two plates A and B in combined or sandwiched reversed position, such that the plate member 104a has come into position in the cut out 100b on the extension 102b. Similar parts on the two plates A and B are designated with the same reference numbers but furnished with the letter "a" or "b", respectively. It will be understood that their two plates A and B thus rest on each other at the respective ends, such that part 104a on plate A rests on part 100b on plate B and vice versa.

In the center slits 106 through the two plates, is positioned during the mounting a locking member 108, dimensioned to make possible a limited lengthwise mutual displacement between the two combined plates.

Figure 21:
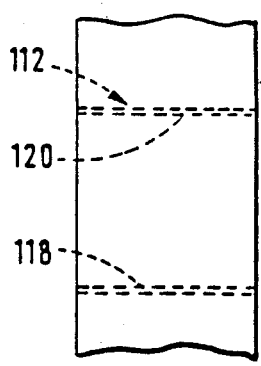
FIGS. 21 to 23 are views illustrating a support provided with a through-going support for reception of a bridge element as shown in FIGS. 16 to 20, FIGS. 24 to 26 are views illustrating an end section of a beam furnished with an imbedded support box designed for reception of a bridge element as shown in FIGS. 16 to 20.
Figure 22:
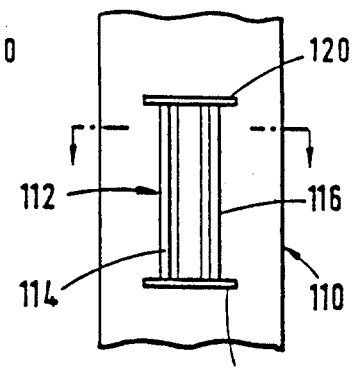
Figure 23:
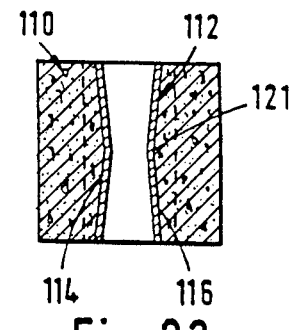

FIGS. 21, 22 and 23 showing a lateral view, a front view and a cross-sectional view, respectively, of a part of a concrete column 110 provided with an imbedded support box 112, preferably made of welded steel plating with two mutually spaced side walls 114, 116, and bottom and top walls 118, 120. The box has a height and width suitable for reception of the two combined plates as shown in FIGS. 18 to 20. The side walls are preferably somewhat bevelled outwards from the center portion 121, as indicated in FIG. 23.

Figure 15A:
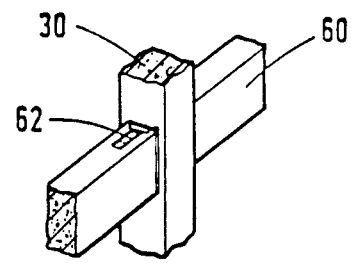
Figure 15B:
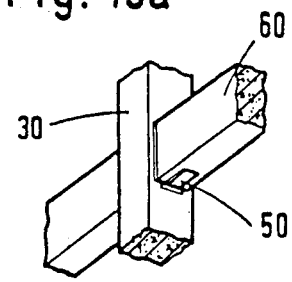
Figure 24:
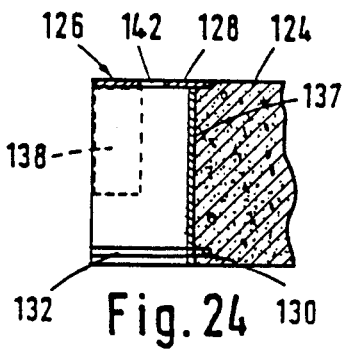
Figure 25:
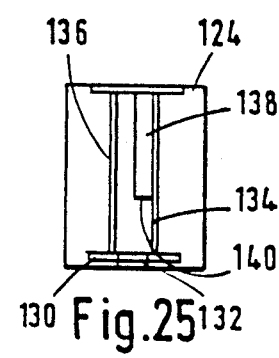
Figure 26:
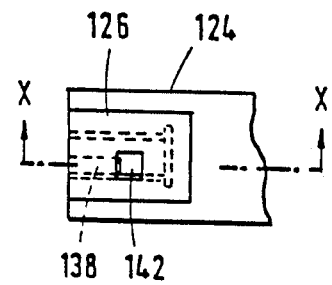

FIGS. 24, 25 and 26 show a lateral view (a section along plane X—X shown in FIG. 26), an end view and a plan view, respectively, of the end portion of a beam 124 provided with an imbedded support box 126 adapted for reception of the combined plates constituting the bridge element 98 utilized with this embodiment of the invention. The box is preferably made of welded steel plates consisting of a top wall 128, a bottom wall 130 provided with a central opening 132 (see FIG. 25), side walls 134, 136, and a rear wall 137. On one of the side walls 134 is positioned a plate-shaped support element 138 dimensioned for positioning in the cut of 100a or 100b, respectively, in the respective plate A or as shown in FIGS. 15 to 17. The support element 138 is dimensioned such that it laterally fits in between the support plate designated 104a, and the opposing side edge designated 100b as shown in FIG. 18. Further, an under edge 140 of the support element 138 has such level that it comes onto rest on the top edge 105b in the recess 100b. Finally, the support box has an opening 142 in the top plate 138 to provide access for a locking member. Only the joint between the bridge element with the plates A and B on one side of the column is here described in detail since the joints between the two beams and the column are identical on either side of the column.

Figure 27:
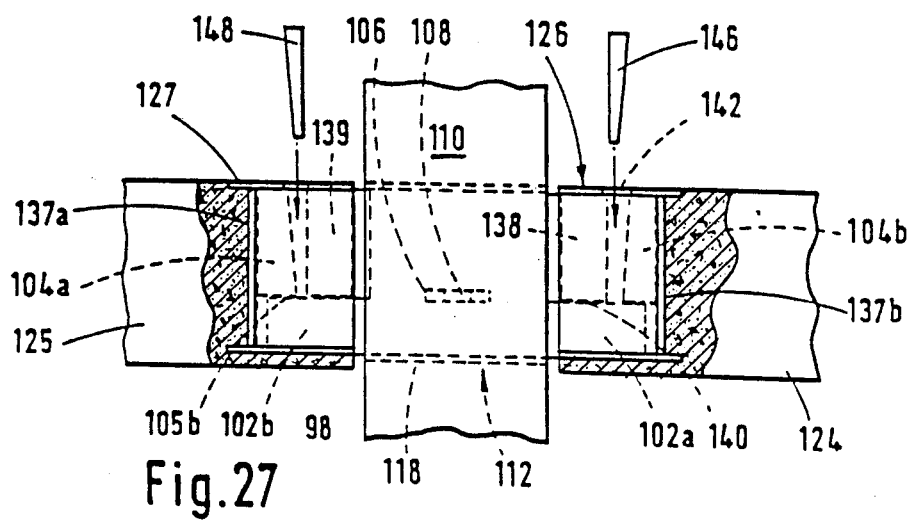
FIG. 27 is a lateral view illustrating a junction between two beams and a column joined together by means of the embodiment for the invention illustrated in FIGS. 16 to 26.

In the following shall be described the mounting and functioning of the embodiment of the invention as shown in FIGS. 16 to 27, with special reference to FIG. 27 wherein is showing a ready mounted junction with bilateral support for two opposing beams.

Subsequent to the column 110 of an actual building having been erected, and being ready for mounting of the beams, the bridge element composed of the two sandwiched or combined plates A and B as shown in FIGS. 18-19 is supported in the support box 112 in the column. Thereafter the beams can be hung or threaded onto the bridge element from above, since the support box 126 in the beam is, as mentioned, provided with an opening 132 in its bottom. Thereby the under edge 140 on the support element 138 in the support box 126 in the beam will come to rest on the top edge 105a or 105b in the cut out or extension 102a or 102b on the plate A or B. Simultaneously the top edge of the plate B or A will come to rest against the under side of the top wall 128 in the support box.

As illustrated in FIG. 27, which shows a lateral view of a finished joint or junction, the beam 124 has, via the support element 138, come to rest against the extension 105a on the plate member A, while the beam 125, via the support element designated 137, has come to rest against the top edge or extension 105b on the plate B. Vertical loads on the plates A and B constituting the bridge element 98 are thus transferred from the support element 138 to 105a, and from 139 in the other support box 105b, respectively, and is transferred to the bottom plate 118 in the support box 112 in the column. Vertical loads from the beams will thus be transferred to the columns via both plates A and B on both sides of the column. Only in the case when the vertical loads arising from the beam 124 and beam 125 are different, torsional forces will arise and will then normally be transferred to the column via the top plate 120 in the support box 112 in the column 110.

Finally shall be mentioned that the vertical loads from the beams can also be transferred to the bridge element in that the top edges of the plates A and B rest against the under side of the top plates 128 in the support boxes in the beams.

In this position wedge members 146, 148 are put down into the openings 142,142 in the top plate 128,128 in the support boxes in the beam ends, respectively. Each of these wedge members will, on the side towards the column be biased against the inside edge of the support element 139, 138, respectively, in the support boxes in the beams. Simultaneously will the outside edges of the wedge members be biased against the inside edge of the plate elements 104a, 104b, respectively, on the plates A and B, and thereby press the end edge against the back wall 137a, 137b in the support boxes in the beams (See FIG. 23). By means of this construction each beam 124, 125 will thereby be laterally and torsionally fixed to the plates A and B, respectively, simultaneously as vertical loads, as previously mentioned, will be transferred via extensions 102a and 102b to the support box in the column. The effect of this special fixation of the beams to the plate elements constituting the bridge element is that both beams can undergo limited mutual horizontal movements as well as relative to the column in that the support elements 138, 139, respectively, slide along the top edge of the extensions 102a, 102b, respectively, (simultaneously the plates A and B will slide mutually).

Vertical forces in the beam 124 are transferred to the plate A via the extension 102a and from this to the support box in the column, while possible vertical moments in the beam 124 will be transferred to the plate B via the extension 104b, the support element 138 and the wedge member 146 located therebetween effecting the wedging together of the before mentioned parts. Vertical forces in the other beam 125 will, in the same fashion, be transferred to the plate element B via the extension 102b and from the same to the support box in the column, while possible vertical moments in the beam 125 will be transferred to the plate element A and from this to the column in the same fashion as described with respect to the beam 124. If the wedge members have a length such that they extend all the way down to the extensions 102a and 102b, the connection can also be at least in part torsionally fixed in the opposite direction (i.e. upwards), inasmuch as the wedge member then also will be positioned below the horizontally extending statically center axis of the beam. The fact that the beams may undergo limited horizontal movements both mutually and relative to the column is important, because thereby the joints can absorb so-called "constrained forces" which may arise due to the crimp in the concrete and temperature variations. Such constrained forces will primarily arise on the inside of a building frame construction and then result in lateral displacements and tension concentration in the junctions. By utilizing the junction solution as shown in FIGS. 16 to 27 such displacements and tensions in the junctions can be avoided. The embodiments of the invention as shown in FIGS. 1 to 15 may also be utilized inside the building, but will be most suitable along the outside of the building, i.e. at the end points of the floor construction, since the constrained forces will, along the outside of the building, be rather small.

Complementary parts of beams, bridge elements and support boxes, etc. are dimensioned such that small open spaces 140, 142 will be present on either side of the column in order to make possible dimensioned movements between beams and the column. Such open spaces may be filled with plaster or the like when the building structure is completely erected. Likewise the under sides of the support boxes in the beams may be covered and protected with plaster or other suitable material. When the floor decks or elements have been positioned onto the beams, no steel parts will thus be exposed, and it should also be noted that all the load sustaining parts in the junctions will be positioned in the center portions of the concrete elements, and are thereby well protected in case of fire.

Figure 13:
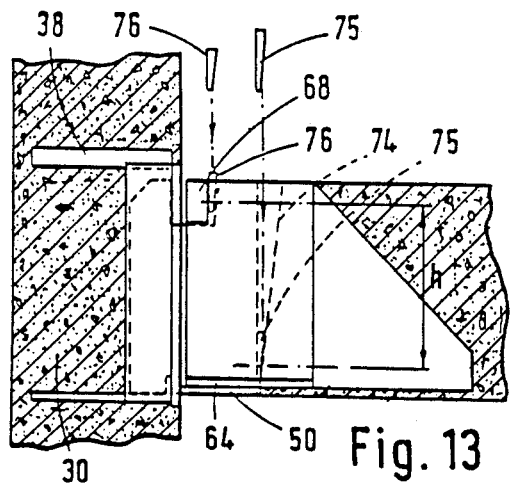
Figure 14:
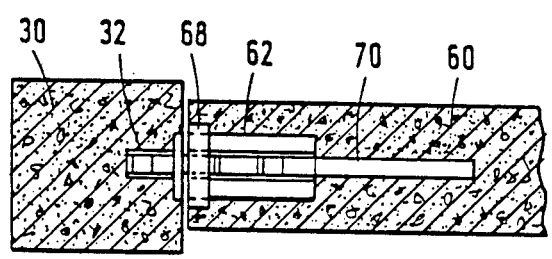

A junction with the bilateral solution as illustrated in FIGS. 16 to 27 will attain an appearance almost exactly identical with the appearance of the junction as shown in FIGS. 13 and 14.

In regard to the embodiments of the invention shown in FIGS. 1 to 15, it will be understood the joints are such as can be arranged on one, two, three, or all four sides of the columns and be used for various applications in building structures. The embodiment shown in FIGS. 16 to 27 is particularly adaptable for building structures with bilateral beam configurations.

It will be understood that the invention as described and shown in the drawings may be embodied in other specific forms of the invention without the party from the essential features thereof.

I claim:

1. A joint for joining concrete beams and concrete columns in a building structure, said joint comprising:
   a support casing imbedded in an end portion of a beam, said support casing having an open end flush with a transverse end surface of said beam;
   a complementary support casing imbedded in a column for supporting said beam, said complementary support casing having an open end opening onto and flush with a side surface of said column;
   a separate mountable and removable bridge element for positioning in and between said support casing and said complementary support casing so as to form a supporting bridge between said column and said beam, wherein said support casing of said beam has an upwardly open aperture opening onto an upper surface of said beam for enabling access to said bridge element when said bridge element is in said support casing; and locking means to be positioned in said upwardly open aperture for horizontally fixedly locking said bridge element in place with respect to said support casing, said locking means comprising at least one wedge element for disposition between said bridge element and said support casing.

2. The joint as set forth in claim 1, wherein:

said support casing in said beam extends substantially from a lower surface of said beam to said upper surface of said beam, said support casing has a top plate and a bottom plate, and said bottom defines a bottom opening for mounting said beam on said bridge element from above.

3. The joint as set forth in claim 1, wherein:

said bridge element is a plate shaped element having a height substantially greater than its width and is adapted to be received in said support casing and said complementary support casing in a substantially upright position.

4. The joint as set forth in claim 3, wherein:

said bridge element further comprises a recess on the underside thereof; and said complementary casing has complementary means for engaging said recess of said bridge element.

5. The joint as set forth in claim 1, wherein:

said complementary support casing comprises means for holding said bridge element in place in said complementary support casing, said means including a locking member at an upper end of said open end of said complementary support casing; and said bridge element has a recess on an upper portion thereof for engagement with said locking member.

6. The joint as set forth in claim 5, wherein:

said support casing of said beam has a transverse member at an upper portion thereof for engagement with said recess of said bridge element.

7. The joint as set forth in claim 6, wherein:

said means of said complementary support casing for holding said bridge element in place further comprises a transverse latch member at a lower end of said open end of said complementary support casing; and said bridge element further comprises a transverse plate on the underside thereof for engagement with said transverse latch member so that said bridge element can be supported on said complementary support casing both at the top and bottom thereof.

8. The joint as set forth in claim 7, wherein:

said support casing of said beam further comprises a transverse member for engaging and resting on said transverse plate of said bridge element, whereby said beam can be supported on said bridge element both at the top and bottom thereof.

9. The joint as set forth in claim 1, wherein:

said bridge element comprises two substantially rectangular plate elements.

10. The joint as set forth in claim 9, wherein:

said complementary support casing in said column has side walls therein extending therethrough, said side walls tapering closer to each other from the outside surfaces of said column toward the center of said column, whereby said bridge element, when disposed in said complementary support casing, can undergo limited lateral movement in the horizontal plane relative to said complementary support casing.

11. The joint as set forth in claim 9, wherein:

each said plate element has an opening therein extending therethrough;

a locking element is provided to be positioned in said opening for locking said plate elements to each other; and said openings and said locking elements are provided such that limited horizontal movement can take plate between said plate elements when held together with said locking element.

12. The joint as set forth in claim 11, wherein:

each said support casing in a said beam has a top plate; and said plate elements of said bridge element are dimensioned such that the upper edge surfaces thereof will contact said top plates of the respective said support casings when said support casings of said beams are on said bridge element, whereby said top plates receive a portion of the vertically directed forces arising from connection of said beams to said bridge element.

13. The joint as set forth in claim 9, wherein:

said two plate elements are identical, face each other, and are in abutting relation.

14. The joint as set forth in claim 13, wherein:

said complementary support casing has a second open end opposite the first open end and flush with the side of said column opposite the first side, said complementary support casing extending entirely through said column; and said bridge element is longer than the extent of said complementary support casing extending through said column such that when said bridge element is in place inside said complementary support casing, portions of said bridge element can extend outside each end of said complementary support casing.

15. The joint as set forth in claim 14, and further comprising:

a second support casing imbedded in a second beam, said second support casing having an open end flush with a transverse end surface of said beam, whereby said bridge element can support both said beams at respective ends thereof by engagement with said support casings.

16. The joint as set forth in claim 15, wherein:

each said plate element of said bridge element has a lateral projection at one end thereof and an open portion at the other end thereof, said plate elements being disposed relative to each other such that the lateral projection of one said plate element is in the open portion of the other said plate element;

each said support casing of said beams has a laterally projecting member therein for disposition in a respective said open portion of one of said plate elements such that each said laterally projecting member is adjacent the lateral projection of the other said plate element;

said second support casing having an upwardly open aperture opening onto an upper surface of said second beam for enabling access to said bridge element when said bridge element is in said second support casing; and second locking means is provided to be positioned in said upwardly open aperture of said second support casing for horizontally fixedly locking said bridge element in place with respect to said support casing, said second locking means comprising a wedge element for disposition between said bridge element and said second support casing, said wedge elements of respective said support casings being positionable between a respective laterally projecting member and lateral projection.

17. The joint as set forth in claim 16, wherein:

each said open portion of a said plate element is partly defined by an upper surface of said plate element, whereby said laterally projecting member of each said support box rests on a respective said upper surface of a said plate element.

18. A joint assembly for joining concrete beams and concrete columns in a building structure, said joint assembly comprising:

a support casing to be imbedded in an end portion of a beam, said support casing having an open end to be disposed flush with a transverse end surface of the beam;

a complementary support casing to be imbedded in a column for supporting the beam, said complementary support casing having an open end for opening onto and being flush with a side surface of the column;

a separate mountable and removable bridge element for positioning in an between said support casing and said complementary support casing for forming a supporting bridge between the column and the beam, wherein said support casing has an upwardly open aperture for opening onto an upper surface of the beam for enabling access to said bridge element when said bridge element is in said support casing; and locking means to be positioned in said upwardly open aperture for horizontally fixedly locking said bridge element in place relative to said support casing, said locking means comprising at least one wedge element for disposition between said bridge element and said support casing.

* * * * *